United States Patent
Bean

(10) Patent No.: US 7,962,702 B1
(45) Date of Patent: Jun. 14, 2011

(54) MULTIPLE INDEPENDENT LEVELS OF SECURITY (MILS) CERTIFIABLE RAM PAGING SYSTEM

(75) Inventor: Reginald D. Bean, Center Point, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 578 days.

(21) Appl. No.: 11/825,727

(22) Filed: Jul. 9, 2007

(51) Int. Cl.
*G06F 12/14* (2006.01)
*G06F 13/00* (2006.01)

(52) U.S. Cl. .................. 711/154; 711/E12.091; 711/163
(58) Field of Classification Search ............ 711/E12.091
See application file for complete search history.

(56) References Cited

U.S. PATENT DOCUMENTS

| | | | |
|---|---|---|---|
| 4,809,347 A * | 2/1989 | Nash et al. ............... | 706/20 |
| 6,467,027 B1 * | 10/2002 | Kyker et al. ............... | 711/125 |
| 7,606,363 B1 * | 10/2009 | MacDonald et al. ........ | 713/150 |
| 2002/0095557 A1 * | 7/2002 | Constable et al. ........... | 711/163 |
| 2004/0088488 A1 * | 5/2004 | Ober et al. ................... | 711/125 |
| 2006/0023486 A1 * | 2/2006 | Furusawa et al. ............ | 365/145 |
| 2007/0033369 A1 * | 2/2007 | Kasama et al. ............... | 711/170 |
| 2007/0226493 A1 * | 9/2007 | O'Brien et al. ............... | 713/166 |
| 2007/0226494 A1 * | 9/2007 | O'Brien et al. ............... | 713/166 |
| 2008/0141266 A1 * | 6/2008 | Hunt et al. ............ | 711/E12.091 |

FOREIGN PATENT DOCUMENTS

| | | | |
|---|---|---|---|
| JP | 60197994 A | * | 10/1985 |
| JP | 01094594 A | * | 4/1989 |

OTHER PUBLICATIONS

Hardin et al., "A Robust Machine Code Proof Framework for Highly Secure Applications," Aug. 2006, Proceedings of the sixth international workshop on the ACL2 theorem prover and its applications, pp. 11-20.*

* cited by examiner

*Primary Examiner* — Michael C Krofcheck
(74) *Attorney, Agent, or Firm* — Matthew J. Evans; Daniel M. Barbieri

(57) ABSTRACT

The present invention is directed to an integrated circuit, a method and a system for executing a sequence of instruction loaded from an external storage element and ensuring the authenticity of the sequence of instructions via RAM paging. In one embodiment, the integrated circuit includes a processor for executing a sequence of instructions loaded from an external storage element. To ensure the authenticity of the sequence of instructions from the external storage element, the processor supports Multiple Independent Levels of Security (MILS) or another partitioning scheme. A zeroizer is included to zeroize the on-die memory banks thereby ensuring that the processor is incapable of accessing residual sequences of instructions as loaded and stored from the external storage element thereby ensuring the authenticity of the sequence of instructions executed by the processor.

20 Claims, 2 Drawing Sheets

MULTIPLE INDEPENDENT LEVELS OF SECURITY (MILS) CERTIFIABLE RAM PAGING SYSTEM

FIELD OF THE INVENTION

The present invention generally relates to the field of integrated circuits, and more particularly to an integrated circuit for executing instructions from an external storage element and ensuring the authenticity of the instructions.

BACKGROUND OF THE INVENTION

Many computing environments process and transmit information having different security classification levels. For example, military computing environments process classified information having security levels such as top secret and secret, as well as unclassified information. Typically, unclassified information is separated from classified information in these computing environments, so that classified information is not improperly passed to an unsecured computing environment. This separation is often accomplished through hardware and/or software that creates partitions within the environment where the information is stored, effectively creating an electronic barrier between the various levels of sensitive information. For example, partitioned processing environments have been developed that enable single processors to host Multiple Independent Levels of Security (MILS). One example of such a processor is the AAMP7G processor manufactured by Rockwell Collins of Cedar Rapids, Iowa, which utilizes a National Security Agency (NSA) certified brickwall Partition Management Unit (PMU) to enforce separation of processes.

In some operating systems, it is not possible for such a processor to operate directly from flash memory and/or from other nonvolatile storage elements, for example, devices including nonvolatile memory, such as re-writable, general purpose mass storage devices. Due to the need to trust and ensure the authenticity of the code being executed, such systems would require a processor connected to a very large RAM component capable of storing executable code loaded from the nonvolatile storage element. Due to Application Specific Integrated Circuit (ASIC) die limitations, growing software executable sizes, and the need for MILS in some applications, there is a need to limit the size of the on-die RAM while still maintaining the integrity of the executable code and allowing a processor to execute code loaded from a nonvolatile storage element.

SUMMARY OF THE INVENTION

Accordingly, the present invention is directed to an integrated circuit, a system, and a method for executing a sequence of instructions loaded from an external storage element and ensuring the authenticity of the sequence of instructions via RAM paging.

In one exemplary embodiment, the integrated circuit includes a processor for executing a sequence of instructions loaded from an external storage element. In order to conserve on-die storage space, executable code is stored off-die in the external storage element and is loaded into separate on-die memory banks as needed. To ensure the authenticity of the sequence of instructions from the external storage element, the processor supports Multiple Independent Levels of Security (MILS) or another partitioning scheme. Included in the integrated circuit is a zeroizer that is capable of zeroizing the memory banks prior to the memory banks receiving a sequence of instructions from the external storage element. This step of zeroizing ensures that the processor is not able to access residual data from a previous sequence of instructions having an unauthorized classification level. In order to maximize the efficiency of the processor, the integrated circuit is designed to simultaneously perform a zeroization of one memory bank then load a set of code while the processor executes another set of code from the other memory bank. Following the processor's execution of the code on the first memory bank, the processor performs a partition switch and then executes the code from the second memory bank thereby ensuring that the processor is allowed access to only one set of code at a time, with one classification level at a time.

It is to be understood that both the foregoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
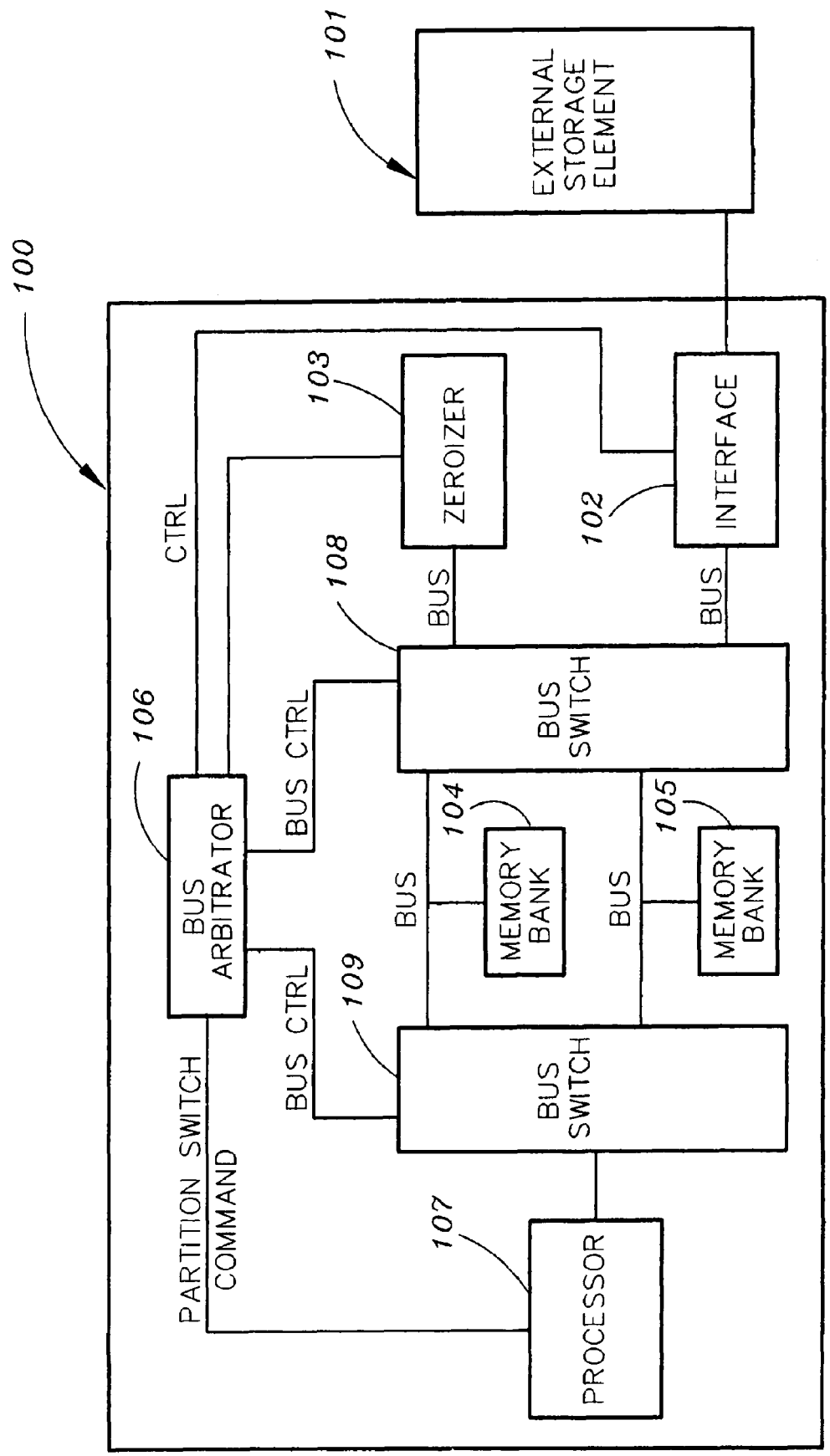
FIG. 1 is a diagram illustrating an integrated circuit in accordance with the present invention.
Figure 2:
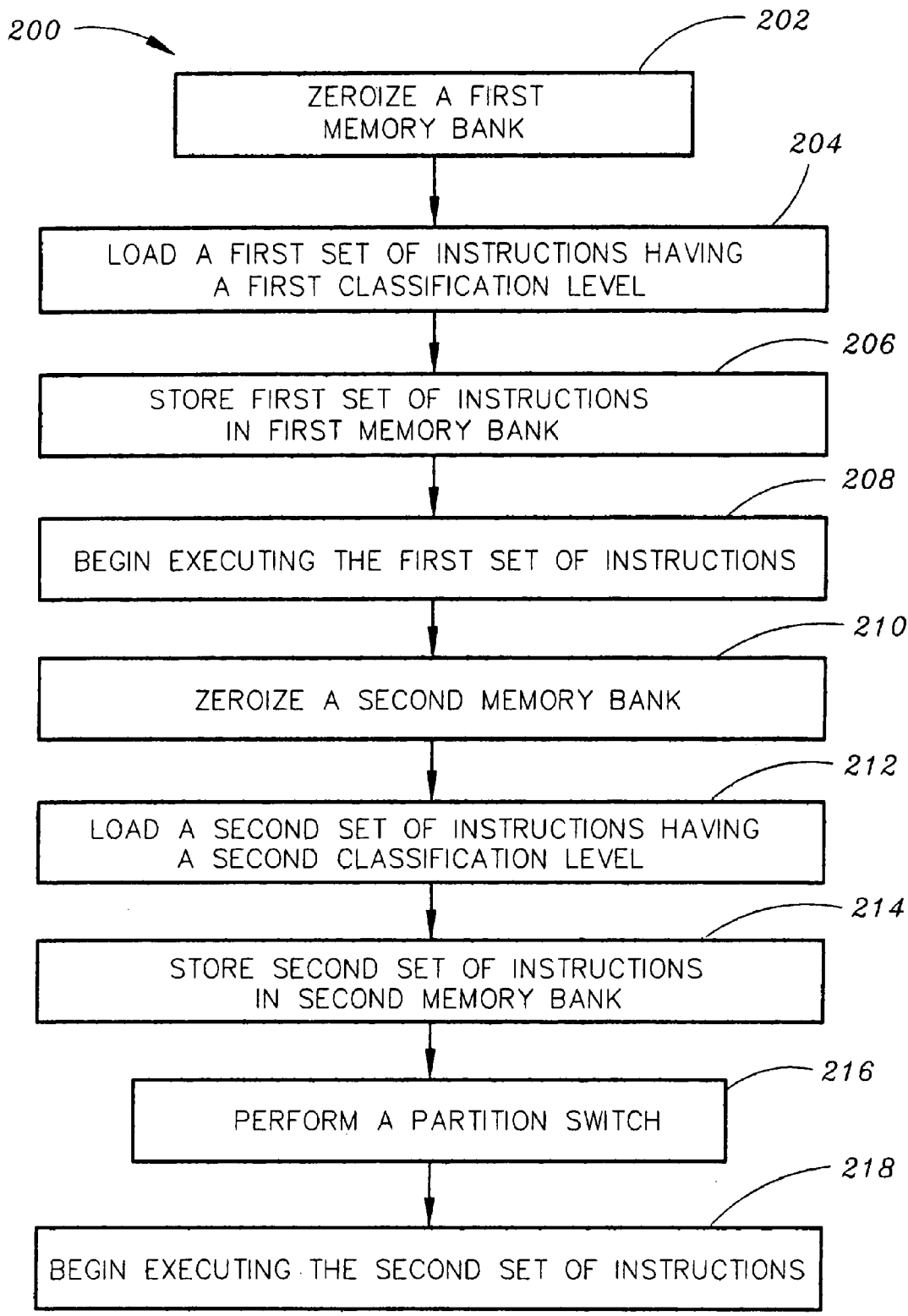
FIG. 2 is a flow chart illustrating a method for executing instructions loaded from an external storage element and ensuring the authenticity of the instructions.

Referring generally to FIGS. 1 and 2, an integrated circuit 100 is described in accordance with exemplary embodiments of the present invention. The integrated circuit 100 includes a processor 107 for executing a sequence of instructions loaded from an external storage element 101. The external storage element 101 may include a flash memory device, and/or other nonvolatile storage elements, such as devices including nonvolatile memory, (e.g., re-writable, general purpose mass storage devices). Furthermore, it is contemplated that the external storage element may include volatile memory, including RAM accessible via an interface control 102, such as RAM included with a computer linked to the integrated circuit 100 via an Ethernet connection, or the like. In exemplary embodiments, the processor 107 supports Multiple Independent Levels of Security (MILS) or another partitioning scheme for ensuring the authenticity of the code being executed.

The integrated circuit 100 comprises an interface control 102 with interface control logic for connecting to the segregated storage locations of the external storage element 101. The interface control 102 is coupled with a first memory bank 104 and a second memory bank 105. The first and second memory banks 104 and 105 are configured for storing sets of instructions loaded from the segregated storage locations of external storage element 101. In exemplary embodiments, instructions from the external storage element are loaded into the first and second memory banks 104 and 105 via the interface control 102 for execution by the processor 107. By alternately loading executable code into the first and second memory banks 104 and 105, while enforcing classification level separation via the processor 107, the authenticity of the executable code is ensured within the integrated circuit 100. Furthermore, alternately storing the sets of instructions on the first and second memory banks 104 and 105 allows the processor to continually execute instructions, while enforcing security separation, and still providing for a reduced amount of on-die memory. To enforce security separation between subsequent loads of each of the memory banks 104 and 105, the integrated circuit 100 includes a zeroizer 103 for alternately zeroizing the first and second memory banks 104 and 105, enforcing the partitioning of 2 or more sets of instructions. In this manner, when the processor is executing from one memory bank 104, it is ensured the processor cannot access data from the other memory bank 105, nor can it access data from the previous load of the same memory bank 104, nor can it access data from the next future load of the same memory bank 104. Likewise, when the processor is executing from memory bank 105, it cannot access data from memory bank 104, nor can it access past or future loads on the same memory bank 105.

The external storage element 101 includes a sequence of data including a first set of instructions having a first classification level and a second set of instructions having a second classification level, followed by a third or more sets of instructions having yet different classification levels. For example, in one specific embodiment, the external storage element 101 includes a sequence of data comprising executable code. The executable code includes code for executing a first computer program in a first partition having a first classification level, and code for executing a second computer program in a second partition having a second classification level, and code for executing a third computer program in a third partition having a third classification level, and code for executing a fourth computer program in a fourth partition having a fourth classification level. In this embodiment, the first through fourth sets of processor 107 instructions comprise the code for executing the first through fourth computer programs. It is contemplated that the number of instructions included in the each set of instructions will be limited by the relative sizes of the first memory bank 104 and the second memory bank 105. However, by alternately loading multiple sets of instructions as multiple partitions utilizing the integrated circuit 100 of the present invention, the programs may be fully executed in a partitioning computer environment while still maintaining the authenticity and integrity of the executable code.

In this manner, it will be apparent that the first set of instructions will share the classification level of the first computer program, and the second set of instructions will share the classification level of the second computer program and so forth for subsequent sets of instructions. It will be appreciated that the sequence of instructions which change at each partition switch or processor 107, may be loaded from a wide variety of computer programs. Alternatively, it should be noted that the computer programs as referenced herein may include a variety of executable configurations. For example, in one specific embodiment, the first and second sets of instructions represent portions of a process thread, while in another embodiment, the first and second sets of instructions represent portions of an operating system. However, it will be appreciated that these examples are explanatory only, and are not meant to be limiting of the present invention. Thus, the first, second and subsequent sets of instructions may be loaded from a wide variety of executable code sources without departing from the scope and intent of the present invention.

The zeroizer 103 is utilized for zeroizing the first memory bank 104 to remove any residual data from a previous instruction set. Then, interface control 102 is utilized for loading the first set of instructions (e.g., a first portion of code from a first computer program) from the external storage element 101 to the first memory bank 104, which stores the first set of instructions. The processor 107 is then coupled with the first memory bank 104 for executing the first set of instructions. While the processor 107 executes the first set of instructions, the zeroizer is utilized for zeroizing the second memory bank 105 before storing the second set of instructions. Then, the interface control 102 is utilized for loading the second set of instructions (e.g., a second portion of code from a second computer program) from the external storage element 101 to the second memory bank 105, which stores the second set of instructions.

In this manner, the second set of instructions is loaded into the second memory bank 105 while the first set of instructions is being executed by the processor 107. Next, the processor 107 performs a partition switch, and then begins to execute the second set of instructions stored in the second memory bank 105. While the processor 107 is executing the second set of instructions, the zeroizer 103 is utilized for zeroizing the first memory bank 104 to remove any residual data from the previous instruction set. Then, interface control 102 is utilized for loading a third set of instructions (e.g., a third computer program) from the external storage element 101 to the first memory bank 104, which stores the third set of instructions. In this manner, the third set of instructions is loaded into the first memory bank 104 while the second set of instructions is being executed by the processor 107. Next, the processor 107 performs a partition switch, and then begins to execute the third set of instructions stored in the first memory bank 104. While the processor 107 is executing the third set of instructions, the zeroizer 103 is utilized for zeroizing the second memory bank 105 to remove any residual data from the previous instruction set. Then, interface control 102 is utilized for loading yet a fourth set of instructions (e.g., a fourth computer program) from the external storage element 101 to the second memory bank 105, which stores the fourth set of instructions. In this fashion, all sets of instructions are executed in a round-robin fashion by executing a partition switch between each set of instructions. Once the last set of instructions has been switched to, processing continues back with the first set of instructions. Thus, the processor is able to ensure the authenticity of the sequence of data comprising the first and subsequent sets of instructions, while enforcing the classification levels of the first and subsequent sets of instructions. The processor repeats the above steps until commanded to terminate.

An additional advantage of the present invention may be realized by including a step wherein the zeroization of the first and second memory banks 104 & 105 is preceded by writing residual data from the memory banks to an off-die storage element for storage and subsequent retrieval. For example, in one specific embodiment, data entered by a user is written back to the external storage element 101. In another embodiment, unexecuted code is written back to another storage element, such as off-die RAM included with a personal computer, or the like. It will be appreciated that some or all of the data resident in either of the memory banks may be written back to an external storage element. As previously discussed, the step of zeroization is necessary to remove any residual data from the memory bank prior to a partition switch, thereby preventing the processor from accessing residual instruction with a different classification level than is within the classification level of the new partition.

The effect of the zeroization is a complete erasure of the instruction set on the respective memory bank. At the time of zeroization, all data and/or unexecuted code remaining on the memory bank is lost and therefore unavailable for subsequent utilization unless the data/unexecuted code is stored prior to zeroization. Storing the unexecuted code on-die may require an additional on-die memory bank thereby allowing the unexecuted code to remain on-die while the processor executes from a different memory bank within a different partition. This solution may be undesirable due to the cost associated with adding another memory bank. Therefore, it is contemplated that writing the data/unexecuted code from the on-die memory bank to an off-die storage element for storage and subsequent retrieval would be an effective technique. This would eliminate the need for additional on-die memory space while still providing storage for the data/unexecuted code.

In specific embodiments, the off-die storage element is a memory storage device and may include volatile memory such as dynamic RAM, static RAM, content addressable memory (CAM), dual-ported RAM (DPRAM), non-volatile RAM (NVRAM), semiconductor memory or non-volatile memory such as flash memory, magnetic RAM, read-only memory, programmable read-only memory (PROM), erasable PROM, magnetic storage (such as a computer hard disk, a floppy disk drive and magnetic tape) and optical disc drives. In one specific embodiment, the off-die storage element is the flash memory drive as previously described.

In exemplary embodiments, the integrated circuit 100 is an electrical circuit and may also be an analog circuit, a digital circuit, a parallel circuit, a series circuit, an optical circuit and/or a printed circuit on a circuit board. In one specific embodiment, the circuit is an ASIC.

In exemplary embodiments, the interface control 102 includes a physical interface and may include terminal blocks, crimp-on terminals, insulation displacement connectors, plug-and-socket connectors, component connectors, device connectors, 8P8C connectors, DE-9 connectors, Universal Serial Bus (USB) connectors, Firewire connectors, wireless connectors, infrared connectors and/or network connectors. In one specific embodiment, the interface control 102 includes a USB connector.

In exemplary embodiments, the external storage element 101 is nonvolatile and may include flash memory, magnetic RAM, read-only memory, programmable read-only memory (PROM), erasable PROM, magnetic storage (such as a computer hard disk, a floppy disk drive and magnetic tape), optical disc drives and early computer storage methods such as paper tape and punch cards. The external storage element 101 is connected to the integrated circuit 100 via the interface control 102 and therefore an appropriate type of interface control 102 should be selected so as to maintain data separation while being compatible with the chosen external storage element 101. In one specific embodiment, the external storage element 101 is a flash memory drive and is connected to the integrated circuit 100 via a parallel interface to interface control 102. In another embodiment, the external storage element 101 may include multiple storage elements such as 2, 3, 4, 5 or 6 storage elements, each capable of being used in conjunction with an interface control 102 independently and/or congruently.

In exemplary embodiments, the first memory bank 104 and the second memory bank 105 are volatile, on-die random access memory (RAM). The first memory bank 104 and the second memory bank 105 may include dynamic RAM, static RAM, content addressable memory (CAM), dual-ported RAM (DPRAM), non-volatile RAM (NVRAM), semiconductor memory and early computer storage methods such as delay line memory and Williams-Kilburn tube. The first memory bank 104 is connected to the interface control 102 via a bus switch 108 thereby allowing the first memory bank 104 to receive executable code from the external storage element 101. The second memory bank 105 is connected to the interface control 102 via the bus switch 108 thereby allowing the second memory bank 105 to receive executable code from the external storage element 101. In one specific embodiment, the first memory bank 104 and the second memory bank 105 are on-die RAM within the integrated circuit 100. In another embodiment, the integrated circuit 100 may contain more than two memory banks and may include 3, 4, 5, 6, 7 or 8 memory banks, each memory bank being connected to the interface control 102 via the bus switch 108 thereby allowing each additional memory bank to receive executable code from the external storage element 101.

In exemplary embodiments, the zeroizer 103 includes locally executable code or a sequence of coded instructions to delete sensitive information from the first memory bank 104 and/or the second memory bank 105 by various well-known scrubbing techniques. The zeroizer 103 is connected to the first memory bank 104 and the second memory bank 105 via the bus switch 108 thereby allowing the first memory bank 104 to be zeroized by the zeroizer 103, while the second memory bank 105 is being utilized by the processor 107, and allowing the second memory bank 105 to be zeroized by the zeroizer 103, while the first memory bank 104 is being utilized by the processor 107. In one embodiment with RAM, it may be necessary to write a pattern of all zeros to the memory bank thereby resetting the entire memory bank to all zeros (0's) and erasing any sensitive information. In another embodiment with magnetic memory, it may be necessary to write a pattern of all ones (1's) and then all 0's to the memory to clean out residual information retained in the magnetic storage medium. Alternatively, with semiconductor memory, a high voltage may be written to each memory location. In some cases, it may be necessary to access special circuits adapted to perform the zeroization process such as an erase control line that causes a bulk erase of a sector in a memory device. The zeroizer 103 may include an established zeroization process and/or a unique zeroization process developed for a specific application within the integrated circuit 100. In a specific embodiment, the zeroizer 103 is a microprocessor containing executable code to scrub alternately the first and second memory banks 104 & 105, as described above.

In exemplary embodiments, the processor 107 is a MILS compatible processor such as a processor selected from the Rockwell AAMP processor family. The processor 107 may include any processor capable of intrinsic partitioning thereby allowing the processor 107 to enforce an explicit communication policy between applications. The processor 107 is connected to the first memory bank 104 and the second memory bank 105 via a bus switch 109 thereby allowing the processor 107 to alternately read sensitive information from the first and second memory banks 104 & 105. In a specific embodiment, the processor 107 is a MILS compatible AAMP7 processor.

In a specific embodiment, the integrated circuit 100 includes a bus arbitrator 106 for selecting between the memory banks 104 and 105. Thus, the bus arbitrator 106 is a means for facilitating the sequence of data to be transferred within the integrated circuit 100. The bus arbitrator 106 is separate from the processor 107 and is configured to have a plurality of bus control lines for controlling buses connecting the aforementioned elements of the integrated circuit 100. In a specific embodiment, the bus arbitrator 106 contains bus control lines between the arbitrator 106 and each of the interface control 102, the bus switch 108, the zeroizer 103, the bus switch 109 and the processor 107.

In one embodiment, the bus arbitrator 106 is capable of issuing multiple consecutive read or write requests on the buses and it can also abort read or write requests during address cycles. In a specific embodiment, the bus arbitrator 106 is capable of being signaled by the processor 107 to activate a bus connection between the processor 107 and the first memory bank 104 thereby establishing a communication pathway between the two elements via the bus switch 109 and allowing the processor 107 to read and verify the sensitive information contained within the first memory bank 104. Additionally, the bus arbitrator 106 is capable of being signaled by the processor 107 to activate a bus connection between the zeroizer 103 and the first memory bank 104 thereby establishing a communication pathway between the two elements via the bus switch 108 and allowing the zeroizer 103 to zeroize the first memory bank 104. In another embodiment, the bus arbitrator 106 is capable of being signaled by the processor 107 to activate a bus connection between one of the memory banks 104 and 105 and the external storage element 101 thereby establishing a communication pathway between the two elements via the interface control 102 and allowing the processor 107 to initiate the transfer of the external storage element's information to one of the first or second memory banks 104 and 105 via the interface control 102 and the bus switch 108.

Referring now to FIG. 2, a method 200 for executing a sequence of data loaded from an external storage element and ensuring the authenticity of the sequence of data is described. First, a zeroizer is utilized for zeroizing a first memory bank to remove any residual data from a previous instruction set, 202. Next, a first set of instructions having a first classification level is loaded from the external storage element, 204. The first set of instructions is stored in the first memory bank, 206. The first set of instructions is then executed, 208. While the first set of instructions is being executed, a zeroizer is utilized for zeroizing a second memory bank to remove any residual data from a previous instruction set, 210, a second set of instructions having a second classification level is loaded from the external storage element, 212, and the second set of instructions is stored in the second memory bank, 214. In this manner, the second set of instructions is loaded into the second memory bank while the first set of instructions is executed. Finally, a partition switch is performed, 216, and the second set of instructions stored in the second memory bank is executed. Thus, the processor is able to ensure the authenticity of the sequence of data comprising the first and second set of instructions, while enforcing the classification levels of the first and second set of instructions.

In the exemplary embodiments, steps of the method 200 may be implemented as sets of instructions or software. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the present invention. The accompanying method claims present elements of the various steps in a sample order, and are not necessarily meant to be limited to the specific order or hierarchy presented.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. An integrated circuit for executing a sequence of data loaded from an external storage element and ensuring authenticity of the sequence of data, the sequence of data including a first set of instructions having a first classification level and subsequent sets of instructions having other classification levels, the integrated circuit comprising:
   an interface that connects to segregated storage locations of the external storage element and loads the first set of instructions from a first storage location of the external storage element and the subsequent sets of instructions from other storage locations of the external storage element, the first set of instructions having a first classification level and subsequent sets of instructions having other classification levels;
   a first memory bank disposed on the integrated circuit and coupled with the interface that stores the first and subsequent sets of instructions;
   a second memory bank disposed on the integrated circuit and coupled with the interface that stores the second and subsequent sets of instructions;
   a zeroizer coupled with the first memory bank and the second memory bank that zeroizes the first memory bank before storing the first set of instructions and zeroizes the second memory bank before storing the second set of instructions and then alternatingly zeroizes the first and second memory banks for subsequent sets of instructions, the zeroizer configured to delete and erase data stored within said first memory bank and the second memory bank, the zeroizer configured to write a continuous pattern of at least one of ones or zeros within a memory bank to remove residual information retained in the memory bank; and
   a processor alternately coupled with the first memory bank that executes the first set of instructions and the second memory bank that executes the second set of instructions and alternates between the first and second memory banks for subsequent sets of instructions, the processor having partition switching capability for enforcing the first classification level and subsequent classification levels,
   wherein the second set of instructions is loaded into the second memory bank while the first set of instructions is being executed by the processor, and the processor performs a partition switch before executing the second set of instructions for ensuring the authenticity of the sequence of data, the processor writes at least one of unexecuted code or data entered by a user from at least one of the first memory bank or the second memory bank to said external storage element, while the second set of instruction is being executed, prior to zeroizing the at least one of the first memory bank or the second memory bank.

2. The integrated circuit as claimed in claim 1, further comprising a bus arbitrator alternately coupling the processor to the first memory bank and the second memory bank.

3. The integrated circuit as claimed in claim 2, wherein the processor supplies the bus arbitrator with a command upon performing the partition switch coupling the processor to the second memory bank.

4. The integrated circuit as claimed in claim 2, further comprising a first bus switch alternately coupling the processor to the first memory bank and the second memory bank, and a second bus switch coupling the interface and the zeroizer to the first memory bank and the second memory bank.

5. The integrated circuit as claimed in claim 4, wherein the bus arbitrator alternately couples the processor with the first memory bank and the second memory bank with the interface and the zeroizer.

6. The integrated circuit as claimed in claim 1, wherein at least one of the first classification level and the second classification level include a security classification defined by a Multiple Independent Levels of Security (MILS) classification scheme.

7. The integrated circuit as claimed in claim 1, wherein the external storage element comprises at least one of a flash drive, magnetic RAM, read-only memory, programmable read-only memory, erasable programmable read-only memory, magnetic storage and optical disc drives.

8. A method for executing a sequence of data loaded from an external storage element and ensuring authenticity of the sequence of data, the sequence of data including a first set of instructions having a first classification level and a second set of instructions having a second classification level, and subsequent sets of instructions having other classification levels, the method comprising:
   zeroizing a first memory bank, zeroizing the first memory bank including deleting and erasing data stored within said first memory bank;
   loading a first set of instructions from the external storage element;
   storing the first set of instructions in the first memory bank;
   executing the first set of instructions;
   zeroizing a second memory bank while executing the first set of instructions, zeroizing the second memory bank including deleting and erasing data stored within said second memory bank;
   loading a second set of instructions from the external storage element while executing the first set of instructions, the first set of instructions having a first classification level and said second set of instructions having a second classification level being stored in segregated storage locations of said external storage element;
   storing the second set of instructions in the second memory bank while executing the first set of instructions;
   performing a partition switch before executing the second set of instructions for ensuring the authenticity of the sequence of data;
   executing the second set of instructions while writing any residual data within the first memory bank to the external storage element followed by zeroizing the first memory bank and then loading a subsequent set of instructions into the first memory bank; and
   executing the subsequent set of instructions.

9. The method as claimed in claim 8, wherein the step of zeroizing the first memory bank comprises receiving a command to establish a bus connection between a processor and a zeroizer, wherein the zeroizer is commanded to zeroize the first memory bank.

10. The method as claimed in claim 8, wherein the step of loading the first set of instructions from the external storage element comprises receiving a command to establish a bus connection between a processor and an external storage element, wherein the external storage element is commanded to load a first set of instructions in the first memory bank.

11. The method as claimed in claim 8, wherein the step of zeroizing the second memory bank while executing the first set of instructions comprises receiving a command to establish a bus connection between a processor and a zeroizer, wherein the zeroizer is commanded to zeroize the second memory bank while the processor is executing the first set of instructions.

12. The method as claimed in claim 8, wherein the step of loading the second set of instructions from the external storage element while executing the first set of instructions comprises receiving a command to establish a bus connection between a processor and an external storage element, wherein the external storage element is commanded to load the second set of instructions in the second memory bank while the processor executes the first set of instructions.

13. The method as claimed in claim 8, wherein the step of performing a partition switch before executing the second set of instructions is performed by a processor compatible with a partitioning scheme for ensuring the authenticity of the code being executed.

14. A system for executing a sequence of data loaded from an external storage element and ensuring authenticity of the sequence of data, the sequence of data including a first set of instructions having a first classification level and a second set of instructions having a second classification level and subsequent sets of instructions having subsequent levels, the system comprising:
   an interface that connects to segregated storage locations of the external storage element and loads the first set of instructions from a first storage location of the external storage element and the second set of instructions from other storage locations of the external storage element, the first set of instructions having a first classification level and said second set of instructions having a second classification level;
   a first memory bank disposed on an integrated circuit and coupled with the interface that stores the first set and subsequent sets of instructions;
   a second memory bank disposed on the integrated circuit and coupled with the interface that stores the second set and subsequent sets of instructions;
   a zeroizer coupled with the first memory bank and the second memory bank that zeroizes the first memory bank before storing the first set and subsequent sets of instructions and zeroizes the second memory bank before storing the second set and subsequent sets of instructions, the zeroizer configured to write at least one of zeros or ones to the first memory bank and the second memory bank to delete and erase all data from the first memory bank and the second memory bank;
   a processor alternately coupled with the first memory bank that executes the first set and subsequent sets of instructions and the second memory bank that executes the second set and subsequent sets of instructions; and
   a partitioning scheme that enforces the first classification level and the second classification level and additional classification levels,
   wherein the second set and subsequent sets of instructions are loaded into the second memory bank while the first set and subsequent sets of instructions are being executed by the processor, and the processor performs a partition switch according to the partitioning scheme before executing the second set and subsequent sets of instructions for ensuring the authenticity of the sequence of data, the processor writes at least one of unexecuted code or data entered by a user from at least one of the first memory bank or the second memory bank to said external storage element, while the second set of instruction is being executed, prior to zeroizing the at least one of the first memory bank or the second memory bank.

15. The system as claimed in claim 14, further comprising a bus arbitrator alternately coupling the processor to the first memory bank and the second memory bank.

16. The system as claimed in claim 15, wherein the processor supplies the bus arbitrator with a command upon performing the partition switch coupling the processor to the second memory bank.

17. The system as claimed in claim 15, further comprising a first bus switch alternately coupling the processor to the first memory bank and the second memory bank, and a second bus switch coupling the interface and the zeroizer to the first memory bank and the second memory bank.

18. The system as claimed in claim 17, wherein the bus arbitrator alternately couples at least one of the first memory bank and the second memory bank with the interface and the zeroizer.

19. The system as claimed in claim 14, wherein at least one of the first classification level and the second classification level include a security classification defined by a Multiple Independent Levels of Security (MILS) classification scheme.

20. The system as claimed in claim 14, wherein the external storage element comprises at least one of a flash drive, magnetic RAM, read-only memory, programmable read-only memory, erasable programmable read-only memory, magnetic storage and optical disc drives.

\* \* \* \* \*